United States Patent [19]

Feinberg

[11] 4,026,570

[45] May 31, 1977

[54] CASTER FOR LUGGAGE

[75] Inventor: Irving Feinberg, Saddle Brook, N.J.

[73] Assignee: Presto Lock Company, Division of Walter Kidde & Company, Inc., Elmwood Park, N.J.

[22] Filed: Sept. 29, 1975

[21] Appl. No.: 617,512

[52] U.S. Cl. .................................. 280/47.17; 16/30; 190/18 A

[51] Int. Cl.² .......................................... B62B 1/04

[58] Field of Search ............ 280/47.17, 79.1, 79.2, 280/79.3, 47.26, 35, 37; 190/18 A, 18 R; 16/29, 30; 248/223; 301/5.3, 5.7

[56] References Cited

UNITED STATES PATENTS

| 1,413,852 | 4/1922 | Hokkanen | 190/18 A X |
| 2,002,836 | 5/1935 | Rossi | 190/18 A X |
| 2,600,748 | 6/1952 | Fox | 248/223 X |
| 2,661,220 | 12/1953 | Davis | 280/47.26 X |
| 2,925,283 | 2/1960 | Stilger | 190/18 A X |

Primary Examiner—Joseph F. Peters, Jr.
Assistant Examiner—R. Schrecengost
Attorney, Agent, or Firm—Shapiro and Shapiro

[57] ABSTRACT

A wheel assembly is detachably connected to a mounting plate assembly that is attached to a corner of a luggage case. One assembly has a latch member resiliently urged into overlying relationship with an aperture that receives a tab on the other assembly, such tab having a cam surface that engages and displaces the latch member as the assemblies are being brought together, and a notch within which the latch member snaps after the assemblies are brought together thereby detachably retaining the one assembly to the other. An extension on the latch member is manually accessible allowing it to be manually displaced out of the notch to detach the assemblies.

10 Claims, 9 Drawing Figures

CASTER FOR LUGGAGE

This invention relates to an attachable caster for a luggage case, and to the constituent parts of such caster, namely a mounting plate assembly that is adapted to be attached to the case, and a wheel assembly that is adapted to be releasably attached to the mounting plate assembly.

BACKGROUND OF THE INVENTION

Increases in the number of travelers using air and rail terminals coupled with a decline in the number and availability of service personnel to assist in transporting hand luggage at such terminals have contributed to a situation in which a traveler, sometime during a given trip, can reasonably expect to be called upon to move his luggage without assistance. In recognition of the reality of such a situation, travelers have begun to shown increasing interest in luggage cases provided with casters.

Manufacturers of luggage cases responded initially to this market by producing cases with four casters attached to the bottom of a case and a towing strap attached to a side of the case adjacent the top allowing the user to pull the case easily as well as to control its direction of movement. Usually, two of the casters would be of the swivelling type and would be placed at the forward end of the case (i.e., the end closest to the strap connection) allowing the user to impart a turning movement to the case with a minimum of effort.

Also, it has been suggested to utilize a pair of rigid or non-swivelling casters located on a corner of the case on a side opposite to the side to which a handle or strap is attached. A lugage case so constructed, termed hereinafter a luggage case of the type described, can be upended by grasping and pulling the strap until the case is angularly balanced on the casters at an inclination dependent on the height of the user. It can be pulled easily by the user with little effort, directional control being effected by wrist movement of the user.

A typical luggage case of the type described is shown in U.S. Pat. No. 2,683,609, the casters disclosed therein having an added advantage of being detachable when not needed. Unfortunately, known detachable casters for luggage cases of the type described are cumbersome and complex with the result that, often, casters are left on a case when they should be removed to facilitate storage of the case, for example, and are not used when a traveler must be his own porter, it being less burdensome to carry the case than to attach the casters.

It is therefore an object of the present invention to provide a new and improved attachable caster for a luggage case of the type described, wherein the attachable caster is simpler in construction and easier to use that attachable casters heretofore known in the art.

BRIEF DESCRIPTION OF THE INVENTION

According to the present invention, an attachable caster for a luggage case of the type described comprises a wheel assembly detachably connected to a mounting plate assembly which is, itself, adapted to be attached to the corner of the case. A support plate on the mounting plate assembly has a pair of spaced apertures for receiving a pair of spaced tabs projecting from a support plate on the wheel assembly when the support plates are in abutting relationship. To releasably retain the plates in such relationship, a movable latch member on the apertured support plate is resiliently urged into overlying relationship with one of the apertures, the tab received therein having a cam surface on its free end adjacent a notch in the side of the tab. As the tab enters the aperture, the cam surface on the tab engages the latch member, camming it out of overlying relationship with the aperture and allowing the support plates to be brought into abutting relationship, at which point the latch member resiliently snaps into the notch and serves to retain the plates together.

Projecting from the mounting plate assembly is an extension of the latch member allowing it to be manually displaced out of the notch and out of overlying relationship with the aperture thereby releasing the notched tab. The wheel assembly can now be separated from the mounting plate assembly.

The mounting plate assembly is made box-like to conceal and protect the latch member and is small enough to be unobtrusive when the wheel assembly is detached. Furthermore, it has no projecting parts that would interfere with stacking of the luggage case to which it is applied inasmuch as the resiliently biased latch member is entirely retained between the support plate and the case. The wheel assembly is also made small enough to easily fit into a handbag or brief case carried by a traveler; and the interconnection between the two assemblies is so simple, by reason of the notched tab/movable latch member arrangement, that both attachment and detachment as needed can be carried out easily.

DESCRIPTION OF THE DRAWINGS

An embodiment of the invention is illustrated in the accompanying drawings wherein.

DETAILED DESCRIPTION OF THE PREFERRED EMBODIMENT

Figure 1:
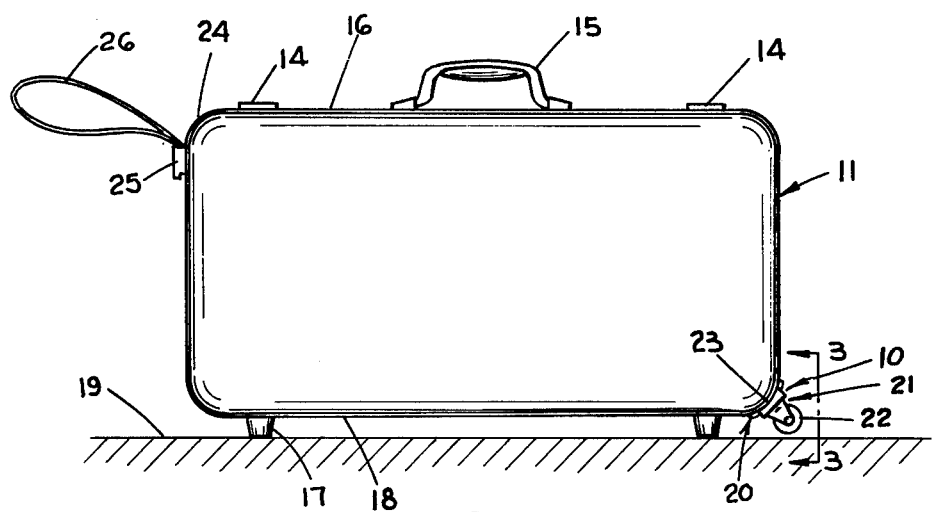
FIG. 1 is a side view of a luggage case in a rest position and having a pair of attachable casters according to the present invention.
Figure 3:
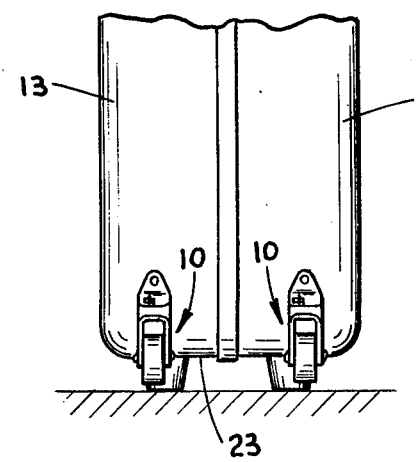
FIG. 3 is a view of the luggage case taken along the line 3—3 of FIG. 1.

Referring to FIG. 1, 10 designates an attachable caster carried by a luggage case 11 typically having a pair of hinged sections or shells 12 and 13 (FIG. 3)

releasably held in a closed position by locks 14. Case 11, typically, has a hand grip 15 on the top edge 16 of one of the shells to enable the user to transport the case in the usual fashion, and four runners 17 on the bottom sides of the shells provide feet that support the case on surface 19 when the case is in its normal position.

Figure 2:
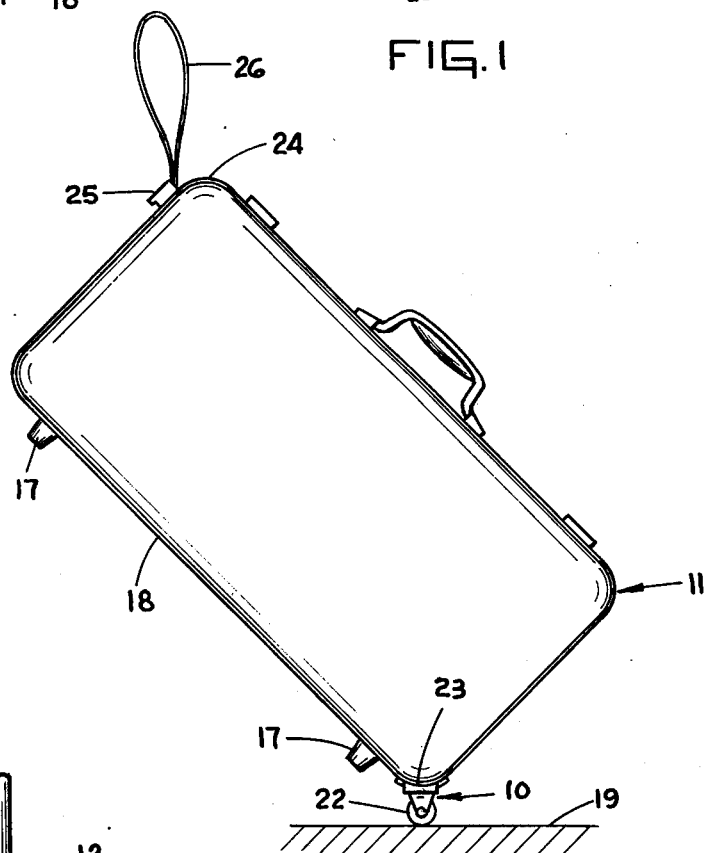
FIG. 2 is a side view of the luggage case of FIG. 1 but showing the case up-ended and balanced on the attachable casters in preparation for moving.

As shown in FIG. 3, two casters 10 are applied to the case, one to each of the shells 12 and 13. Each caster 10, comprising mounting plate assembly 20 attached to the case and wheel assembly 21 carrying wheel 22, is carried by the case on the lower rear corner 23 opposite the upper front corner 24 carrying connector 25 to which pull strap 26 is connected. By grasping the strap when the case is in its rest position shown in FIG. 1, and then lifting, the user can tilt the case to the position shown in FIG. 2 wherein the case is balanced on wheels 22 at an angular position dependent upon the height of the user and the size of the case. The case may then be towed behind the user with the direction of movement being determined by the degree of twist imparted to the pull strap by the user's wrist.

Figure 4:
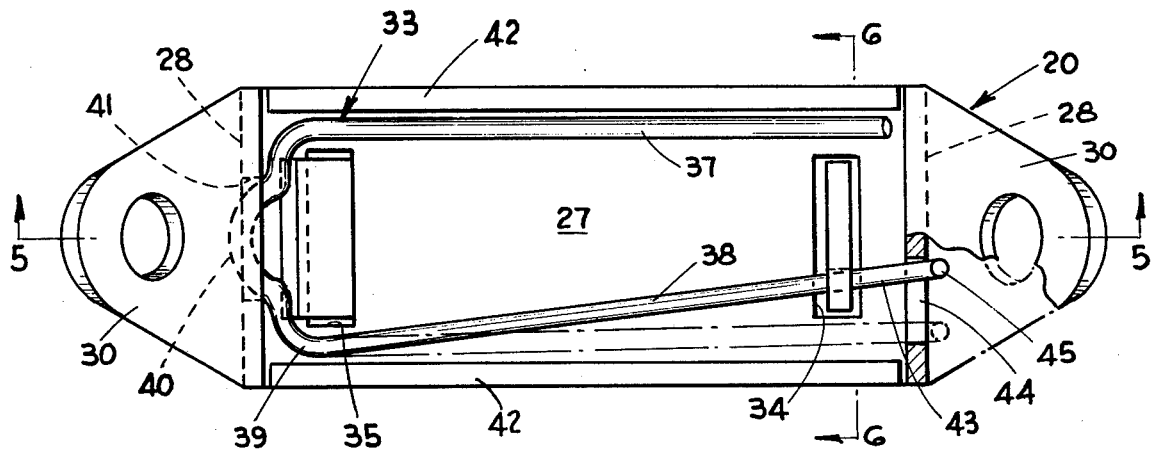
FIG. 4 is a top view of the attachable caster according to the present invention with portions broken away, showing details of the mounting plate assembly.
Figure 5:
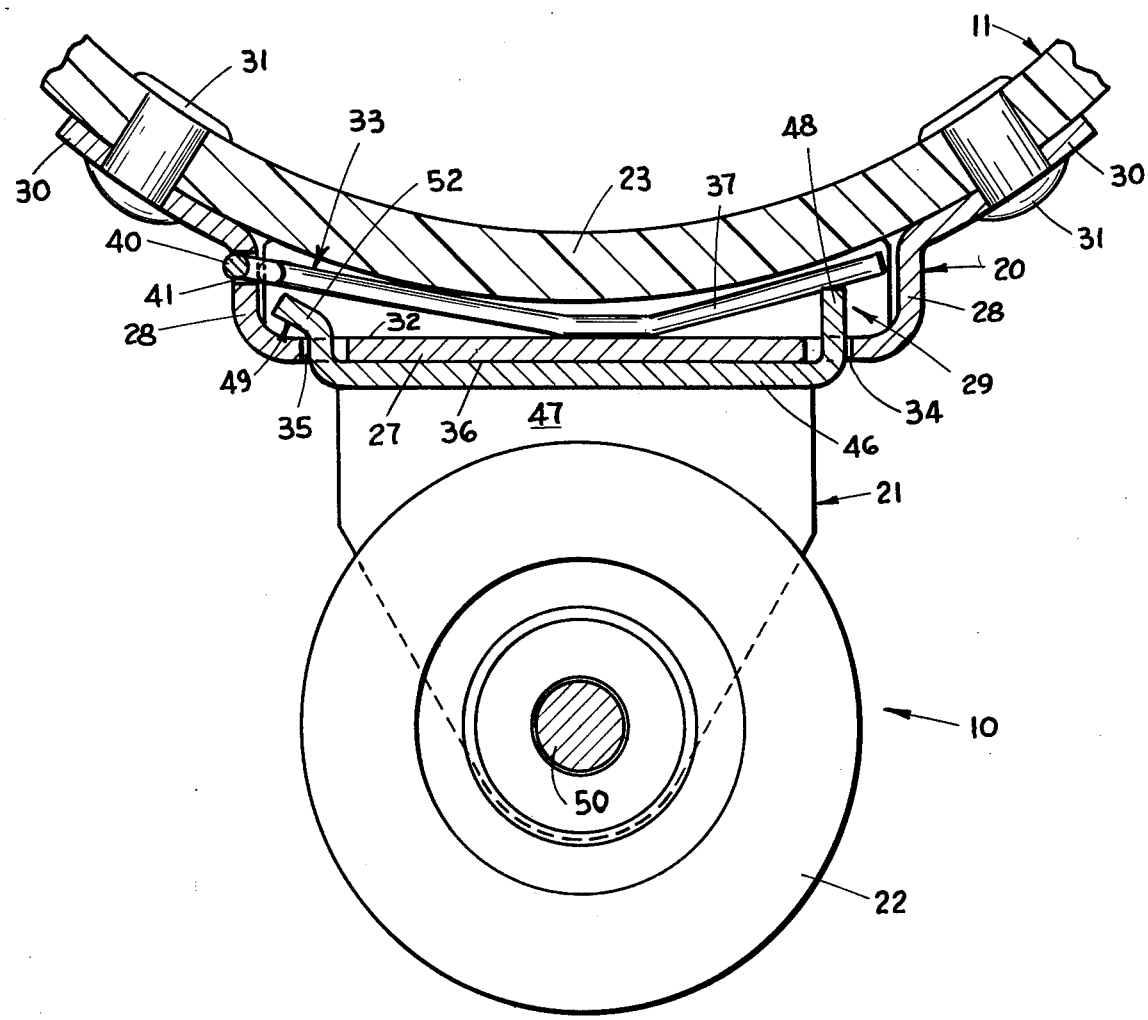
FIG. 5 is a sectional view of the caster taken along the section 5—5 of FIG. 4, this view showing the mounting plate assembly connected to the wall of a luggage case shell and the wheel assembly connected to the mounting plate assembly.
Figure 8:
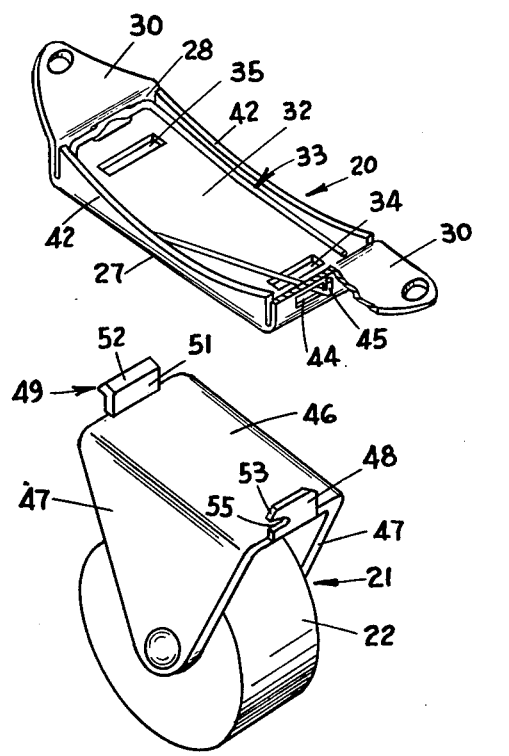
FIG. 8 is an exploded perspective view of the two components of the attachable caster according to the present invention with parts of the mounting plate assembly broken away.

Details of the mounting plate assembly are shown in FIG. 4, 5 and 8 to which reference is now made. Assembly 20 comprises an elongated support plate 27 having an upstanding end wall 28 at each end of the plate, and an upstanding side wall 42 at each side of the plate to form a recess 29 for receiving resilient means 33 described below. Each end wall terminates in an outwardly directed flange 30 that is curved slightly to closely fit the curvature of corner 23 of the case, each flange containing an aperture for receiving a headed fastener such as rivet 31 by which assembly 20 is permanently connected to the case such that inner surface 32 of plate 27 faces the case and recess 29 is closed. Finally, plate 27 has a pair of spaced apertures 34 and 35 located adjacent the respective end walls 28 and passing from inner surface 32 to outer surface 36.

Resilient means 33 is preferably in the form of a U-shaped spring having a pair of spaced legs 37 and 38 interconnected by bight 39 as shown best in FIG. 4. Because of the curvature of corner 23, the opposite ends of leg 37 of the spring are inclined upwardly as shown in FIG. 5 so that the spring can fit within recess 29. To retain the spring in operative position relative to surface 32 of the mounting plate, bight 39 is provided with a centrally located projection 40 that is received in a slot 41 in one end wall 28 remote from the first aperture 34 that is adjacent the opposite end wall. Leg 37 of the spring is positioned in abutting relationship to one of the side walls 42 while the other leg 38 of the spring is resiliently urged toward an operative position (shown in full lines in FIG. 4) overlying the first aperture 34. The free end 43 of leg 39 lies against surface 32 of plate 27 in the vicinity of aperture 34 and projects through slot 44 in end wall 28 adjacent aperture 34 terminating in an up-turned end 45 that projects toward flange 30 as shown in FIG. 8. End 45 is thus accessible on the exterior of the mounting plate assembly and provides means for manually moving the leg 38 against the bias exterted by the remainder of the spring from the operative position overlying aperture 34 to an inoperative position (shown in phantom lines in FIG. 4) out of blocking relationship to the aperture. Upon release of end 45, the resilient nature of the spring will return leg 38 to its operative position.

Details of the wheel assembly 21 are shown in FIGS. 5 and 8 to which reference is now made. Assembly 21 includes an elongated support plate 46 having a pair of spaced side walls 47 on respective opposite sides extending perpendicularly from plate 46 in one direction, and a pair of spaced tabs 48 and 49 on respective opposite ends of the plate extending therefrom in the opposite direction. Each of walls 47 tapers at its free end and carries a shaft 50 upon which wheel 22 is rotatably mounted in a conventional manner.

Tab 49 has an inner connection portion 51 that extends substantially perpendicular to the plane of plate 46 and an outer portion 52 remote from the support plate extending outwardly at an inclined angle to plate 46 as shown in FIG. 5. Tab 48 extends perpendicularly to the plane of plate 46 and has an inclined cam surface 55 on the free end at one side edge 54 of the tab. Edge 54 is also provided with a notch 55 directly below the cam surface, the notch being elongated in the direction of the axis of shaft 50.

Figure 7:
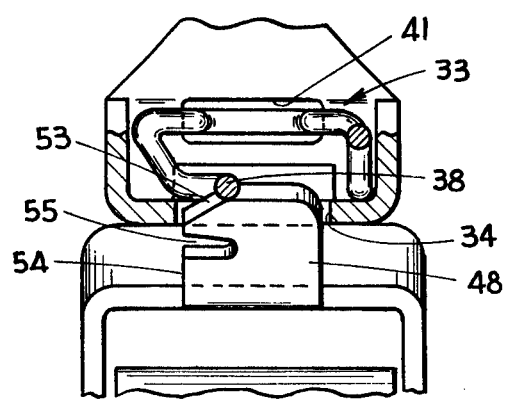
FIG. 7 is a sectional view similar to FIG. 6 except that the wheel assembly is shown just prior to mating with the mounting plate assembly.
Figure 6:
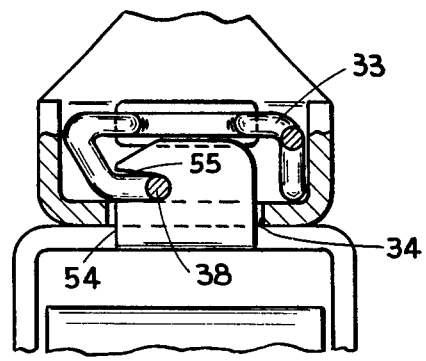
FIG. 6 is a sectional view of the caster taken along the section 6—6 of FIG. 4.

In order to releasably connect wheel assembly 21 to mounting plate assembly 20, the wheel assembly is positioned so that the mounting plate 46 thereon is adjacent mounting plate 36 on the mounting plate assembly, and tabs 48 and 49 are opposite apertures 34 and 35. Then, the wheel assembly is angularly positioned so that outer portion 52 of tab 49 is substantially perpendicular to the plane of plate 36 and the tab is inserted into aperture 35. The wheel assembly is then angularly rotated to move the plate 46 toward abutment with plate 36 causing tab 48 to enter notch 34. As tab 48 enters the notch, cam surfaces 53 engages leg 38 of resilient means 33 as shown in FIG. 7; and further movement of the tab into the notch causes the tab to displace leg 38 from its operative position overlying the aperture against the spring bias of the resilient means to an inoperative position out of overlying relationship to the aperture allowing edge 54 of tab 48 to clear leg 38 and the tab to fully enter the aperture. As plate 46 is then moved into abutting relationship with plate 36, notch 55 moves into alignment with leg 38 which snaps thereinto under the influence of the bias in the resilient means as shown in FIG. 6. Wheel assembly 21 is now releasably connected to the mounting plate assembly. From the above description of the operation of leg 38 of resilient means 33, it can be seen that the leg operates as a biased latch member.

In order to disconnect the wheel assembly from the mounting plate assembly, end 45 on leg 38 of resilient means 33 is displaced against the bias thereof until the leg is in its inoperative position completely withdrawn from notch 53 in tab 48. The wheel assembly can now be rotated from the interconnection between tab 49 and aperture 35 to withdraw tab 48 from aperture 34. After this is achieved, end 45 is released allowing leg 38 to return to its operative position, and the wheel assembly can be separated by withdrawing tab 49 from aperture 35.

Alternative to the construction shown in the drawing, the tabs could be on the support plate of the mounting plate assembly and the spaced apertures could be on the support plate of the wheel assembly. This construction is not as desirable as the preferred construction wherein the mounting plate assembly presents to the exterior of a luggage case a smooth surface free of projecting tabs.

As a further alternative, the resilient means 32 need not be in the form of a U-shaped spring positioned within recess 29 as shown in the drawing. In fact many other types of biased latch members could be utilized. Furthermore, it is possible for both tabs on the wheel member to be notched and a pair of individually or simultaneously operable biased latch members could be mounted on plate 36 within recess 29.

Figure 9:
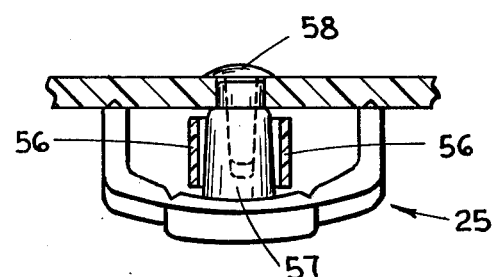
FIG. 9 is a sectional view of an interconnection between the pull strap and the luggage case.

Turning now to pull strap 26, it is preferably a strip of pliant material looped into the form shown in FIG. 1 with the two ends 56 (FIG. 9) held together and passing on each side of a boss 57 that is attached by fastener 58 to the case to define connector 25. Strap 26 is thus permanently fastened to the case.

Alternatively, the strap could be detachably connected to boss 57 by utilizing a "dog-leash" type of snap-hook that could be snapped into releasable engagement with boss 57. In a further alternative arrangement, a variation of the support plates used in caster 10 could be utilized. In such case, the ends of the strap would be riveted or otherwise fixed to a support plate having a pair of tabs similar to tabs 48 and 49 of the wheel assembly in order to define a strap assembly; and a mounting plate assembly like assembly 20 could be fixed to the case instead of connector 25. This arrangement has the advantage of utilizing for both the caster and the pull strap exactly the same mounting plate assembly and is advantageous from the standpoint of greater simplicity in manufacture as well as a more attractive luggage case.

From the above description, it can be seen that the mounting plate assembly and the other assembly according to the present invention provides a particularly simple but effective detachable connection that is easy to manufacture and use.

It is believed that the advantages and improved results achieved by the present invention are apparent from the foregoing description of a preferred embodiment. Various changes and modifications may be made without departing from the spirit and scope of the invention, as sought to be defined in the following claims.

I claim:

1. A mounting plate assembly to which another assembly can be connected comprising:
   a support plate having inner and outer surfaces, and flange means for attachment to a luggage case so that the inner surface of the support plate faces the case;
   the support plate having a first aperture for receiving a notched tab on the other assembly when the latter is connected to the outer surface of the support plate;
   the support plate having a second aperture for receiving a second tab on said other assembly;
   resilient means including a latch member positioned in operative relationship to the inner surface of the support plate and resiliently urged to an operative position overlying said first aperture for engaging the notched tab and releasably retaining the other assembly to the support plate; and
   manually operable means on the latch member for manually displacing the same against the action of the resilient means from the operative position to an inoperative position out of overlying relationship with said first aperture for disengaging the notched tab and releasing the other assembly from the support plate.

2. A mounting plate according to claim 1 wherein said resilient means is in the form of a U-shaped spring having a pair of spaced legs interconnected by a bight, one of the legs constituting said latch member.

3. A mounting plate according to claim 2 wherein said support plate has means at one end for receiving the bight of said spring and an opening at the opposite end for receiving an extension of the leg constituting said latch member, such extension constituting said manually operable means.

4. A mounting plate according to claim 3 wherein said flange means comprises a pair of upstanding walls at opposite ends of the support plate and an outwardly directed flange on each upstanding wall through which a fastener can pass, the means at one end of the support plate for receiving the bight of said spring being an aperture in the upstanding wall at said one end of the support plate.

5. A wheel assembly for connection to a mounting plate attached to a luggage case to form an attachable caster therefor comprising:
   a wheel housing having a support plate with opposite sides and opposite ends, a pair of spaced side walls on respective sides of the support plate extending perpendicularly therefrom in one direction, and spaced tabs on respective ends of the support plate extending therefrom in the opposite direction;
   shaft means extending between the side walls;
   a wheel rotatably mounted on the shaft means between the side walls; p1 one of the tabs extending perpendicularly to the support plate, the tab having a cam surface and a notch in one side edge extending in the direction of the shaft means;
   the second of the tabs having an inner portion adjacent the support plate extending therefrom and an outer portion remote from the support plate extending outwardly at an inclined angle to the support plate.

6. An article of manufacture for a luggage case comprising:
   a mounting plate assembly having a support plate and flange means for attachment to the case;
   another assembly having a support plate;
   one of the support plates having first and second spaced apertures and the other of the support plates having first and second spaced tabs insertable into the respective apertures of said one of the support plates to bring the support plates into abutting relationship;
   a movable latch member on said one of the support plates resiliently urged into overlying relationship with the first aperture;
   said first tab having a cam surface on the free edge thereof engageable with the latch member as the first tab is inserted into the first aperture for camming the latch member out of overlying relationship to the first aperture, said first tab having a notch in an edge adjacent the cam surface for receiving the latch member after the support plates are brought into abutting relationship for releasably connecting the support plates.

7. An article of manufacture according to claim 6 wherein the latch member is provided with manually operable means for manually displacing the latch member out of overlying relationship with the first aperture to thereby withdraw the latch member from the notch and release the support plates.

8. An article of manufacture according to claim 7 wherein said latch member is constituted by one leg of a U-shaped spring having a pair of legs interconnected by a bight.

9. An article of manufacture according to claim 8 wherein the support plate of said mounting plate assembly is the support plate having the spaced apertures and also has means at one end for receiving the bight of said spring and an opening at the opposite end for receiving an extension of the latch member which constitutes said manually operable means.

10. An article of manufacture according to claim 6 wherein the other assembly is a wheel assembly carrying a rotatable wheel.

* * * * *